(12) United States Patent
Kawachi (10) Patent No.: US 12,215,230 B2
(45) Date of Patent: Feb. 4, 2025

(54) TIRE

(71) Applicant: SUMITOMO RUBBER INDUSTRIES, LTD., Hyogo (JP)

(72) Inventor: Takahiro Kawachi, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 925 days.

(21) Appl. No.: 17/330,816

(22) Filed: May 26, 2021

(65) Prior Publication Data

US 2021/0395499 A1  Dec. 23, 2021

(30) Foreign Application Priority Data

Jun. 17, 2020 (JP) ................................. 2020-104626

(51) Int. Cl.
| | | |
|---|---|---|
| *C08L 9/06* | (2006.01) | |
| *B60C 1/00* | (2006.01) | |
| *B60C 11/00* | (2006.01) | |
| *C08L 7/00* | (2006.01) | |

(52) U.S. Cl.
CPC .............. *C08L 9/06* (2013.01); *B60C 1/0016* (2013.01); *B60C 11/0058* (2013.01); *C08L 7/00* (2013.01); *C08L 2205/025* (2013.01); *C08L 2205/035* (2013.01)

(58) Field of Classification Search
CPC ........ C08L 9/06; C08L 7/00; C08L 2205/025; C08L 2205/035; B60C 1/0016; B60C 11/0058
See application file for complete search history.

(56) References Cited

U.S. PATENT DOCUMENTS

| | | | |
|---|---|---|---|
| 2006/0060278 A1* | 3/2006 | Noguchi | ............... B60C 19/001 |
| | | | 152/209.25 |
| 2015/0191052 A1 | 7/2015 | Okabe et al. | |
| 2018/0141378 A1 | 5/2018 | Park et al. | |
| 2019/0233621 A1* | 8/2019 | Takahashi | ................ C08K 3/36 |

FOREIGN PATENT DOCUMENTS

| | | | | |
|---|---|---|---|---|
| EP | 1008466 B1 * | 5/2005 | ............. | B60C 11/00 |
| EP | 301 132 | 4/2018 | | |
| JP | 2012-111269 A | 6/2012 | | |
| JP | 5957474 B2 | 7/2016 | | |

OTHER PUBLICATIONS

Extended European Search Report, European Patent Office, in European Patent Application No. 21178399.8, dated Nov. 16, 2021 (written in English).

* cited by examiner

*Primary Examiner* — Angela C Scott
(74) *Attorney, Agent, or Firm* — GREENBLUM & BERNSTEIN, P.L.C.

(57) ABSTRACT

The present invention provides a tire having a good balance of fuel efficiency, chipping resistance, and steering stability.

16 Claims, 1 Drawing Sheet

FIG. 1

TIRE

TECHNICAL FIELD

The present invention relates to a tire having a good balance of fuel efficiency, chipping resistance, and steering stability.

BACKGROUND OF THE INVENTION

In recent years, VAN tires mainly for the European market have been required to achieve both fuel efficiency and chipping resistance while maintaining steering stability.

JP 5957474 B discloses a heavy duty pneumatic tire having a plurality of circumferential main grooves and lateral grooves in a tread part and having improved fuel efficiency and chipping resistance.

SUMMARY OF THE INVENTION

When tires comprising a lateral groove having no opening to a main groove, the lateral groove having a deep groove depth, are used for running on an irregular ground road surface, they become not easily come off due to stones, etc. being caught in the lateral groove, and heat is generated therefrom, easily causing chip cutting and block chipping of a tread rubber. Therefore, when having such a tread pattern as described above, it is necessary to use a rubber composition having better chipping resistance than usual for a tread part.

Here, increasing a content of a filler to improve the reinforcing property is considered in order to improve the chipping resistance, but there is a concern that the rubber becomes easy to generate heat, deteriorating the fuel efficiency.

An object of the present invention is to provide a tire having a good balance of fuel efficiency, chipping resistance, and steering stability.

As a result of intensive studies, the present inventor has found that the above-described problem can be solved by compounding a predetermined rubber component, a predetermined filler, a silane coupling agent, and a thiuram-based vulcanization accelerator in a predetermined ratio in a rubber layer constituting a tread surface and setting a breaking energy of the rubber layer measured after thermal deterioration within a predetermined range, in a tire comprising a lateral groove having no opening to a main groove, the lateral groove having a deep groove depth, and completed the present invention.

That is, the present invention relates to

[1] A tire comprising a tread, wherein the tread has land parts partitioned by a plurality of circumferential grooves, wherein at least one of the land parts comprises one or more lateral grooves having no opening to any of the circumferential groove at both ends of the lateral groove, and a groove depth of the deepest part of the lateral groove is 80% or more of a thickness of the entire tread part, wherein the tread has at least one rubber layer, wherein a first rubber layer constituting the tread surface is composed of a rubber composition comprising a rubber component, a filler, a silane coupling agent, and a thiuram-based vulcanization accelerator, wherein the rubber component constituting the first rubber layer comprises an isoprene-based rubber, a styrene-butadiene rubber, and a butadiene rubber, wherein the filler comprised in the rubber composition constituting the first rubber layer comprises silica, wherein the rubber composition constituting the first rubber layer comprises 60 parts by mass or more of the filler based on 100 parts by mass of the rubber component, and wherein a breaking energy measured after subjecting the rubber composition constituting the first rubber layer to thermal deterioration at 80° C. for 7 days is 1,000 or more,

[2] The tire of the above [1], wherein the rubber composition constituting the first rubber layer comprises 65 parts by mass or more of the filler based on 100 parts by mass of the rubber component,

[3] The tire of the above [1] or [2], wherein a content of silica in the filler comprised in the rubber composition constituting the first rubber layer is 30 to 95% by mass,

[4] The tire of any one of the above [1] to [3], wherein the rubber composition constituting the first rubber layer comprises 0.1 parts by mass or more of a thiuram-based vulcanization accelerator based on 100 parts by mass of the rubber component,

[5] The tire of any one of the above [1] to [4], wherein the rubber composition constituting the first rubber layer comprises 4.8 parts by mass or more of a silane coupling agent based on 100 parts by mass of the rubber component,

[6] The tire of to any one of the above [1] to [5], wherein the silane coupling agent comprised in the rubber composition constituting the first rubber layer is a mercapto-based silane coupling agent,

[7] The tire of to any one of the above [1] to [6], wherein the rubber component constituting the first rubber layer comprises 10 to 20% by mass of an isoprene-based rubber, 45 to 65% by mass of a styrene-butadiene rubber, and 25 to 35% by mass of a butadiene rubber,

[8] The tire of to any one of the above [1] to [7], wherein the tread has a second rubber layer adjacent to inside in a radial direction of the first rubber layer, and wherein tan δ of the rubber composition constituting the first rubber layer at 70° C. is larger than tan δ of the rubber composition constituting the second rubber layer at 70° C.,

[9] The tire of the above [8], wherein a complex elastic modulus of the rubber composition constituting the first rubber layer at 70° C. is larger than a complex elastic modulus of the rubber composition constituting the second rubber layer at 70° C.,

[10] The tire of the above [8] or [9], wherein the deepest part of the groove bottom of the at least one circumferential groove is formed so as to be located more inside in the radial direction of the tire than the outermost part of the second rubber layer,

[11] The tire of any one of the above [1] to [10], wherein the groove depth of the deepest part of the groove bottom of the circumferential groove is 5.0 mm to 9.0 mm,

[12] The tire of any one of the above [1] to [11], wherein the groove depth of the deepest part of the groove bottom of the circumferential groove is 60 to 90% of the thickness of the entire tread part.

According to the present invention, provided is a tire having a good balance of fuel efficiency, chipping resistance, and steering stability.

DETAILED DESCRIPTION

The tire according to one embodiment of the present disclosure is a tire comprising a tread, wherein the tread has land parts partitioned by a plurality of circumferential grooves, wherein at least one of the land parts comprises one or more lateral grooves having no opening to any of the circumferential groove at both ends of the lateral groove, and a groove depth of the deepest part of the lateral groove is 80% or more of a thickness of the entire tread part, wherein the tread has at least one rubber layer, wherein a first rubber layer constituting the tread surface is composed of a rubber composition comprising a rubber component, a filler, a silane coupling agent, and a thiuram-based vulcanization accelerator, wherein the rubber component constituting the first rubber layer comprises an isoprene-based rubber, a styrene-butadiene rubber, and a butadiene rubber, wherein the filler comprised in the rubber composition constituting the first rubber layer comprises silica, wherein the rubber composition constituting the first rubber layer comprises 60 parts by mass or more of the filler based on 100 parts by mass of the rubber component, and wherein a breaking energy measured after subjecting the rubber composition constituting the first rubber layer to thermal deterioration at 80° C. for 7 days is 1,000 or more.

Although it is not intended to be bound by theory, in the present disclosure, the following can be considered as a mechanism that can improve the fuel efficiency, chipping resistance, and steering stability of the tire with a good balance.

When the content of the filler is increased, the reinforcing property is enhanced, and when three types of rubber components, i.e., an isoprene-based rubber, a styrene-butadiene rubber, and a butadiene rubber, are mixed, phases of different hardness microscopically coexist, becoming less likely to transmit impacts and cracks, and becoming less likely to generate chip cutting and block chipping combined with improvement in reinforcing property.

Here, in order to obtain such a synergistic effect, a uniformity of silica and the rubber becomes important. When the dispersion of silica becomes non-uniform, the rubber becomes easy to generate heat due to concentration of stress, and chip cutting and block chipping of the rubber easily occur. Moreover, if bonding between rubber components is insufficient, the rubber becomes easy to be broken due to thermal deterioration. Therefore, a silane coupling agent is used to improve the dispersibility of silica, and a thiuram-based vulcanization accelerator is used to promote cross-linking between rubbers, enhancing heat aging resistance. Thereby, a synergistic effect by highly filling a multicomponent-based rubber with a filler comprising silica can be further improved.

The rubber composition constituting the first rubber layer preferably comprises 65 parts by mass or more of the filler based on 100 parts by mass of the rubber component.

The content of silica in the filler comprised in the rubber composition constituting the first rubber layer is preferably 30 to 95% by mass.

The rubber composition constituting the first rubber layer preferably comprises 0.1 parts by mass or more of a thiuram-based vulcanization accelerator based on 100 parts by mass of the rubber component.

The rubber composition constituting the first rubber layer preferably comprises 4.8 parts by mass or more of a silane coupling agent based on 100 parts by mass of the rubber component.

The silane coupling agent comprised in the rubber composition constituting the first rubber layer is preferably a mercapto-based silane coupling agent. When a mercapto-based silane coupling agent is used, the dispersibility of silica can be further improved.

The rubber component constituting the first rubber layer preferably comprises 10 to 20% by mass of an isoprene-based rubber, 45 to 65% by mass of a styrene-butadiene rubber, and 25 to 35% by mass of a butadiene rubber. When contents of the isoprene-based rubber, the styrene-butadiene rubber, and the butadiene rubber within the above-described ranges, the effects of the present disclosure can be better exhibited.

It is preferable that the tread has a second rubber layer adjacent to inside in the radial direction of the first rubber layer, and tan δ of the rubber composition constituting the first rubber layer at 70° C. is larger than tan δ at 70° C. of the rubber composition constituting the second rubber layer.

The complex elastic modulus of the rubber composition constituting the first rubber layer at 70° C. is preferably larger than the complex elastic modulus of the rubber composition constituting the second rubber layer at 70° C.

From the viewpoint that the effects of the present disclosure are better exhibited, the deepest part of the groove bottom of the circumferential groove is preferably formed so as to be located more inside the radial direction of the tire than the outermost part of the second rubber layer.

The groove depth of the deepest part of the groove bottom of the circumferential groove is preferably 5.0 mm to 9.0 mm. When the groove depth of the circumferential groove is within such ranges, the effects of the present disclosure can be better exhibited.

The groove depth of the deepest part of the groove bottom of the circumferential groove is preferably 60 to 90% of the thickness of the entire tread part. When the groove depth of the circumferential groove is within such range, the effects of the present disclosure can be better exhibited.

A procedure of manufacturing the tire which is one embodiment of the present disclosure will be described in detail below. However, the following description is illustrative for explaining the present disclosure and is not intended to limit the technical scope of the present invention to this description range only. Besides, in the present specification, a numerical range identified with "to" means to include the numerical values of both ends.

Figure 1:
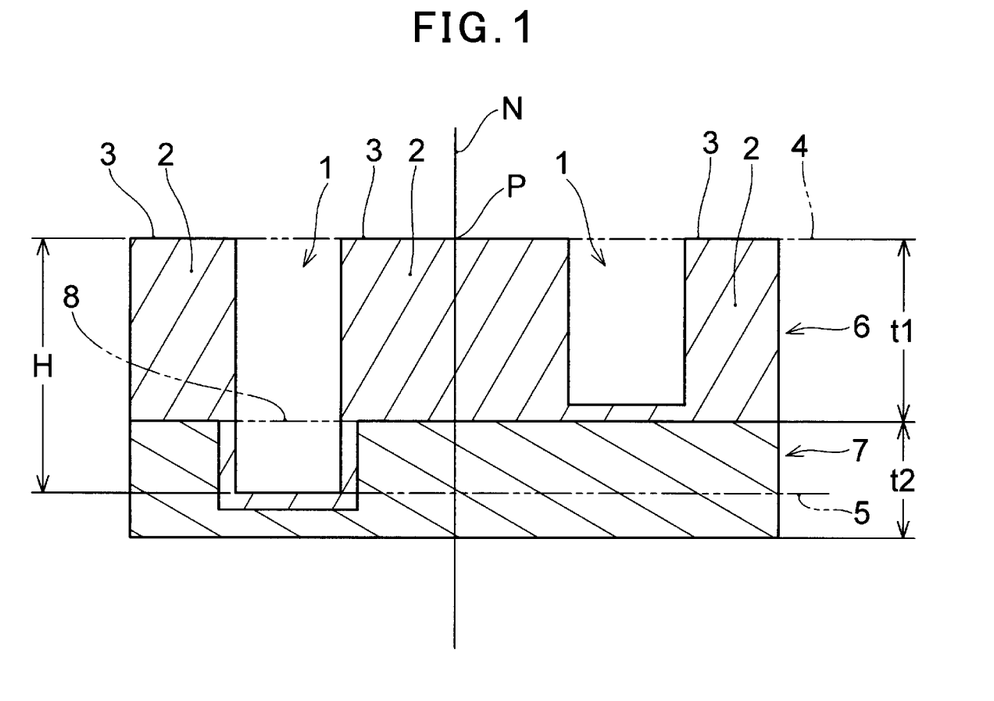
FIG. 1 is an enlarged cross-sectional view schematically showing a part of a tread of a tire.

FIG. 1 is an enlarged cross-sectional view showing a part of the tread of the tire. In FIG. 1, a vertical direction is a radial direction of the tire, a horizontal direction is a width direction of the tire, and a direction perpendicular to a paper surface is a circumferential direction of the tire.

In the present disclosure, as shown in FIG. 1, the tread comprises a first rubber layer 6 which outer surface constitutes a tread surface 3 (hereinafter, may be referred to as a first layer 6) and a second rubber layer 7 adjacent to inside in a radial direction of the first layer 6 (hereinafter, may be referred to as a second layer 7). The first layer 6 typically corresponds to a cap tread. The second layer 7 typically corresponds to a base tread or under tread. Moreover, as long as the object of the present disclosure is achieved, the tread may further have one or more rubber layers between the second layer 7 and a belt layer.

In FIG. 1, a two-way arrow t1 is a thickness of the first layer 6, and a two-way arrow t2 is a thickness of the second layer 7. In FIG. 1, a midpoint of a land part 2 in a width direction of the tire is indicated as a symbol P. A straight line indicated by a symbol N is a straight line (normal line) passing through a point P and perpendicular to a tangent plane at this point P. In the present specification, the thickness t1 and the thickness t2 are measured along a normal line N drawn from the point P on the tread surface at a position where no groove exists, in the cross section of FIG. 1.

In the present disclosure, the thickness t1 of the first layer 6 is, but not particularly limited to, preferably 1.0 mm or more, more preferably 1.5 mm or more, further preferably 2.0 mm or more, particularly preferably 2.5 mm or more. Moreover, the thickness t1 of the first layer 6 is preferably 10.0 mm or less, more preferably 9.0 mm or less, further preferably 8.0 mm or less, particularly preferably 7.0 mm or less.

In the present disclosure, the thickness t2 of the second layer 7 is, but not particularly limited to, preferably 0.5 mm or more, more preferably 1.0 mm or more, further preferably 1.5 mm or more. Moreover, the thickness t2 of the second layer 7 is preferably 6.0 mm or less, more preferably 5.0 mm or less, further preferably 4.0 mm or less, particularly preferably 3.0 mm or less.

A ratio of the thickness t2 of the second layer 7 to the thickness t1 of the first layer 6 (t2/t1) is preferably 0.10 or more, more preferably 0.20 or more, further preferably 0.25 or more particularly preferably 0.30 or more, from the viewpoint of fuel efficiency. On the other hand, it is preferably 5.0 or less, more preferably 2.5 or less, further preferably 1.5 or less, particularly preferably 0.9 or less, from the viewpoint of wet grip performance.

The thickness t2 of the second layer 7 to the thickness of the entire tread part is preferably 10 to 60%, more preferably 13 to 45%, further preferably 16 to 35%, particularly preferably 20 to 30%. Besides, the thickness of the entire tread part in the present disclosure means a total thickness of a rubber layer constituting a tread part, and is calculated by the shortest distance from the tread surface 3 to the belt layer.

The tread of the present disclosure has a plurality of circumferential grooves 1 continuously extending in a circumferential direction of the tire. The circumferential groove 1 extends linearly along the circumferential direction, but is not limited to such an aspect, and for example, may extend in a wavy, sinusoidal, or zigzag shape along the circumferential direction.

The tread of the present disclosure has land parts 2 partitioned by the circumferential grooves 1 in the width direction of the tire.

A groove depth H of the circumferential groove 1 is calculated by a distance between an extension line 4 of the land part 2 and an extension line 5 of the deepest part of the groove bottom of the circumferential groove 1. Besides, for example, when there are a plurality of circumferential grooves 1, the groove depth H is a distance between an extension line 4 of the land part 2 and an extension line 5 of the deepest part of a groove bottom of a circumferential groove 1 having the deepest groove depth among the plurality of circumferential grooves 1 (a circumferential groove 1 on the left side in FIG. 1).

The groove depth H of the circumferential groove 1 is preferably 4.0 mm or more, more preferably 4.5 mm or more, further preferably 5.0 mm or more, particularly preferably 5.5 mm or more, from the viewpoint of wet grip performance. Moreover, it is preferably 9.0 mm or less, more preferably 8.0 mm or less, further preferably 7.0 mm or less, from the viewpoint of chipping resistance.

The groove depth H of the circumferential groove 1 is preferably 50% or more, more preferably 60% or more, further preferably 65% or more, particularly preferably 70% or more of the thickness of the entire tread part. Moreover, the groove depth H of the circumferential groove 1 is preferably 90% or less, more preferably 85% or less, further preferably 80% or less of the thickness of the entire tread part.

One of the circumferential grooves 1 shown on the left side in FIG. 1 is formed so that the deepest part of the groove bottom of the circumferential groove 1 is located inside in a radial direction of the tire with respect to the outermost part of the second layer 7. Specifically, just below the circumferential groove 1 (inside in the radial direction of the tire), the second layer 7 has a recess part recessed inward in the radial direction of the tire with respect to the outermost part, and a part of the first layer 6 is formed with a predetermined thickness in the recess part of the second layer 7. The circumferential groove 1 is formed so as to come into inside the recess of the second layer 7 beyond the outermost part of the second layer 7. Besides, the circumferential groove 1 may be formed at a groove depth that does not reach the outermost part of the second layer 7, such as a circumferential groove 1 shown on the right side in FIG. 1.

At least one of the land parts 2 comprises one or more lateral grooves having no opening to any of the circumferential groove at both ends of the lateral groove, and a groove depth of the deepest part of the lateral groove is 80% or more (preferably 85% or more, more preferably 90% or more) of the thickness of the entire tread part. Moreover, in addition to them, the land parts 2 may provide a lateral groove and/or a sipe having opened one end or both ends to the circumferential groove 1. Besides, in the present specification, a "groove" including a circumferential groove and a lateral groove means a recess having a width larger than at least 2.0 mm. On the other hand, in the present specification, a "sipe" refers to a narrow notch having a width of 2.0 mm or less, preferably 0.5 to 2.0 mm.

In the present disclosure, unless otherwise specified, a dimension and an angle of each member of the tire are measured with the tire being incorporated into a normal rim and filled with air so as to achieve a normal internal pressure. No load is applied to the tire during the measurement. Besides, in the present specification, the "normal rim" is a rim defined, in a standard system including a standard on which the tire is based, for each tire by the standard, for example, herein referred to as a standard rim for JATMA, a "Design Rim" for TRA, or a "Measuring Rim" for ETRTO. In the present specification, the "normal internal pressure" is an air pressure defined for each tire by the standard, herein referred to as a maximum air pressure for JATMA, a maximum value described in the table "TIRE LOAD LIMITS AT VARIOUS COLD INFLATION PRESSURES" for TRA, or "INFLATION PRESSURE" for ETRTO.

The "breaking energy" in the present disclosure is calculated by the following equation by subjecting a No. 3 dumbbell type test piece composed of each test vulcanized rubber composition to heat aging under an atmosphere of 80° C. for 7 days, followed by performing a tensile test under an atmosphere of 130° C. in accordance with JIS K 6251 "Rubber, vulcanized or thermoplastics-Determination of tensile stress-strain properties", and measuring strength at break (TB) (MPa) and elongation at break (EB) (%). The result shows that the higher the numerical value is, the better the chipping resistance is.

$$(\text{Breaking energy}) = (TB \times EB)/2$$

The breaking energy of the rubber composition constituting the first layer 6 is 1000 or more, preferably 1050 or more, more preferably 1100 or more. When the breaking energy is within the above-described ranges, it is considered that the reinforcing property of the rubber can be ensured and the chipping resistance is improved. On the other hand, an upper limit of the breaking energy of the rubber composition constituting the first layer 6 is not particularly limited.

"70° C. tan δ" in the present disclosure refers to a loss tangent tan δ under a condition of a temperature of 70° C., an initial strain of 10%, a dynamic strain of 2%, and a frequency of 10 Hz. A value of 70° C. tan δ of the rubber composition constituting the first layer 6 is preferably higher than a value of 70° C. tan δ of the rubber composition constituting the second layer 7 from the viewpoint of better exhibiting the effect of improving fuel efficiency. The 70° C. tan δ of the rubber composition constituting the first layer 6 is preferably 0.08 or more, more preferably 0.10 or more, further preferably 0.11 or more, further preferably 0.12 or more, further preferably 0.13 or more, particularly preferably 0.14 or more. Moreover, the 70° C. tan δ of the rubber composition constituting the second layer 7 is preferably 0.04 or more, more preferably 0.05 or more, further preferably 0.06 or more, particularly preferably 0.07 or more. On the other hand, the 70° C. tan δ of the rubber composition constituting the first layer 6 and the second layer 7 is preferably 0.16 or less, more preferably 0.14 or less, further preferably 0.13 or less, from the viewpoint of fuel efficiency. A difference between the 70° C. tan δ of the rubber composition constituting the first layer 6 and the 70° C. tan δ of the rubber composition constituting the second layer 7 is preferably 0.01 or more, more preferably 0.02 or more, further preferably 0.03 or more, particularly preferably 0.04 or more.

"70° C. E*" in the present disclosure refers to a complex elastic modulus E* (MPa) under a condition of a temperature of 70° C., an initial strain of 10%, a dynamic strain of 2%, and a frequency of 10 Hz. A value of 70° C. E* of the rubber composition constituting the first layer 6 is preferably higher than a value of 70° C. E* of the rubber composition constituting the second layer 7. When a value of 70° C. E* of the rubber composition constituting the first layer 6 is higher than a value of 70° C. E* of the rubber composition constituting the second layer 7, it is considered that the second layer 7 has a reduced ability of retaining stress stored inside (elastic component) with respect to the first layer 6, and an effect of reducing heat generation by the second layer 7 becomes easy to be obtained. The 70° C. E* of the rubber composition constituting the first layer 6 is preferably 4.0 to 15.0 MPa, more preferably 5.0 to 12.0 MPa, further preferably 6.0 to 10.0 MPa. Moreover, the 70° C. E* of the rubber composition constituting the second layer 7 is preferably 3.0 to 10.0 MPa, more preferably 3.5 to 8.0 MPa, further preferably 4.0 to 7.0 MPa. A difference between the 70° C. E* of the rubber composition constituting the first layer 6 and the 70° C. E* of the rubber composition constituting the second layer 7 is preferably 1.0 MPa or more, more preferably 1.5 MPa or more, further preferably 2.0 MPa or more, particularly preferably 2.5 MPa or more.

[Rubber Composition]

The tire of the present disclosure can improve fuel efficiency, chipping resistance, and steering stability more effectively by cooperating the above-mentioned structure of the tire, particularly the shape of the tread, with the above-described physical properties of the rubber composition.

<Rubber Component>

The rubber composition constituting the first layer 6 comprises an isoprene-based rubber, a styrene-butadiene rubber (SBR), and a butadiene rubber (BR) as essential rubber components, and may comprise a rubber component composed of an isoprene-based rubber, a SBR, and a BR only. The rubber component constituting the second layer 7 comprises preferably an isoprene-based rubber, more preferably an isoprene-based rubber and a BR, and may comprise a rubber component composed of an isoprene-based rubber and a BR only.

(Isoprene-Based Rubber)

Examples of the isoprene-based rubber include a natural rubber (NR), an isoprene rubber (IR), a reformed NR, a modified NR, a modified IR, and the like. As the NR, those common in the tire industry such as, for example, SIR20, RSS #3, and TSR20 can be used. The IR is not particularly limited, and those common in the tire industry such as, for example, an IR 2200 can be used. Examples of the reformed NR can include a deproteinized natural rubber (DPNR), a high-purity natural rubber, and the like, and examples of the modified NR can include an epoxidized natural rubber (ENR), a hydrogenated natural rubber (HNR), a grafted natural rubber, and the like, and examples of the modified IR can include an epoxidized isoprene rubber, a hydrogenated isoprene rubber, a grafted isoprene rubber, and the like. These isoprene-based rubbers may be used alone or two or more thereof may be used in combination.

A content of the isoprene-based rubber (preferably the NR) in 100% by mass of the rubber component constituting the first layer 6 is preferably 1% by mass or more, more preferably 3% by mass or more, further preferably 5% by mass or more, particularly preferably 7% by mass or more, from the viewpoint of chipping resistance. On the other hand, the content of the isoprene-based rubber in 100% by mass of the 40% by mass or less, more preferably 30% by mass or less, further preferably 25% by mass or less, particularly preferably 20% by mass or less. A content of the isoprene-based rubber in 100% by mass of the rubber component when compounded in the rubber composition constituting the second layer 7 is not particularly limited, but can be, for example, 10% by mass or more, 30% by mass or more, 40% by mass or more, 50% by mass or more, or 60% by mass or more.

(SBR)

The SBR is not particularly limited, and examples thereof include a solution-polymerized SBR (S-SBR), an emulsion-polymerized SBR (E-SBR), modified SBRs thereof (a modified S-SBR, a modified E-SBR), and the like. Examples of the modified SBR include a SBR modified at its terminal and/or main chain, a modified SBR coupled with tin, a silicon compound, etc. (a modified SBR of condensate or having a branched structure, etc.), and the like. Furthermore, hydrogenated additives of these SBRs (hydrogenated SBRs) and the like can also be used. Among them, a S-SBR is preferable, and a modified S-SBR is more preferable.

Examples of the modified SBR include a modified SBR into which a functional group commonly used in this field is introduced. Examples of the above-described functional group include, for example, an amino group (preferably an amino group in which a hydrogen atom of the amino group is substituted with a $C_{1-6}$ alkyl group), an amide group, a silyl group, an alkoxysilyl group (preferably a $C_{1-6}$ alkoxysilyl group), an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group (preferably a $C_{1-6}$ alkoxy group), a hydroxyl group, an oxy group, an epoxy group, and the like. Besides, these functional groups may have a substituent. Examples of the substituent include, for example, a functional group such as an amino group, an amide group, an alkoxysilyl group, a carboxyl group, and a hydroxyl group. Examples of the modified SBR include a hydrogenated SBR, an epoxidized SBR, a tin-modified SBR, and the like.

As the SBR, an oil-extended SBR can be used, or a non-oil-extended SBR can be used. When an oil-extended SBR is used, an oil-extended amount of SBR, that is, a content of an oil-extended oil comprised in the SBR, is preferably 10 to 50 parts by mass based on 100 parts by mass of a rubber solid content of the SBR.

The SBRs listed above may be used alone or two or more thereof may be used in combination. As the SBRs listed above, for example, those commercially available from Sumitomo Chemical Co., Ltd., JSR Corporation, Asahi Kasei Corporation, Zeon Corporation, ZS Elastomer Co., Ltd., etc. can be used.

A styrene content of the SBR is preferably 15% by mass or more, more preferably 20% by mass or more, further preferably 25% by mass or more, from the viewpoints of securing damping in the tread part and wet grip performance. Moreover, it is preferably 60% by mass or less, more preferably 50% by mass or less, further preferably 45% by mass or less, from the viewpoints of temperature dependence of grip performance and abrasion resistance. Besides, in the present specification, the styrene content of the SBR is calculated by $^1$H-NMR measurement.

A vinyl content of the SBR is preferably 10 mol % or more, more preferably 13 mol % or more, further preferably 16 mol % or more, from the viewpoints of ensuring reactivity with silica, rubber strength, and abrasion resistance. Moreover, the vinyl content of the SBR is preferably 70 mol % or less, more preferably 65 mol % or less, further preferably 60 mol % or less, from the viewpoints of preventing temperature dependence from increasing, wet grip performance, elongation at break, and abrasion resistance. Besides, in the present specification, the vinyl content (1,2-bond butadiene unit amount) of the SBR is measured by infrared absorption spectrometry.

A weight-average molecular weight (Mw) of the SBR is preferably 150,000 or more, more preferably 200,000 or more, further preferably 250,000 or more, from the viewpoint of abrasion resistance. Moreover, the Mw is preferably 2,500,000 or less, more preferably 2,000,000 or less, from the viewpoints of cross-linking uniformity and the like. Besides, the Mw can be calculated in terms of a standard polystyrene based on measurement values obtained by a gel permeation chromatography (GPC) (for example, GPC-8000 Series manufactured by Tosoh Corporation, detector: differential refractometer, column: TSKGEL SUPERMULTIPORE HZ-M manufactured by Tosoh Corporation).

A content of the SBR in 100% by mass of the rubber component constituting the first layer 6 is preferably 25% by mass or more, more preferably 35% by mass or more, further preferably 45% by mass or more, particularly preferably 50% by mass or more, from the viewpoint of ensuring damping in the tread part. Moreover, it is preferably 80% by mass or less, more preferably 75% by mass or less, further preferably 70% by mass or less, particularly preferably 65% by mass or less, from the viewpoint of suppressing heat generation in the tread part. A content of the SBR in 100% by mass of the rubber component when compounded in the rubber composition constituting the second layer 7 is not particularly limited.

(BR)

The BR is not particularly limited, and those commonly used in the tire industry can be used, such as, for example, a BR having a cis content of less than 50% (a low cis BR), a BR having a cis content of 90% or more (a high cis BR), a rare earth-based butadiene rubber synthesized using a rare earth element-based catalyst (a rare earth-based BR), a BR containing a syndiotactic polybutadiene crystal (a SPB-containing BR), and a modified BR (a high cis modified BR, a low cis modified BR). Examples of the modified BR include a BR modified with a functional group or the like similar to that described in the SBRs above. These BRs may be used alone or two or more thereof may be used in combination.

As the high cis BR, for example, those commercially available from Zeon Corporation, Ube Industries, Ltd., JSR Corporation, etc. can be used. When a high cis BR is compounded, low temperature characteristics and abrasion resistance can be improved. The cis content is preferably 95% by mass or more, more preferably 96% by mass or more, further preferably 97% by mass or more, particularly preferably 98% by mass or more. Besides, in the present specification, the cis content (cis-1,4-bond butadiene unit amount) is a value calculated by infrared absorption spectrometry.

As the rare earth-based BR, those synthesized using a rare earth element-based catalyst and having a vinyl content of preferably 1.8 mol % or less, more preferably 1.0 mol % or less, further preferably 0.8% mol or less, and a cis content of preferably 95% by mass or more, more preferably 96% by mass or more, further preferably 97% by mass or more, particularly preferably 98% by mass or more can be used. As the rare earth-based BR, for example, those commercially available from LANXESS, etc. can be used.

Examples of the SPB-containing BR include those in which a 1,2-syndiotactic polybutadiene crystal is chemically bonded with the BR and dispersed, but not those in which the crystal is simply dispersed in the BR. As such SPB-comprising BR, those commercially available from Ube Industries, Ltd., etc. can be used.

As the modified BR, a modified butadiene rubber (modified BR) modified with a functional group comprising at least one element selected from the group consisting of silicon, nitrogen, and oxygen at its terminal and/or main chain is appropriately used.

Examples of other modified BRs include those obtained by polymerizing 1,3-butadiene with a lithium initiator and then adding a tin compound and in which a modified BR molecule is bonded by a tin-carbon bond at its terminal (a tin-modified BR), and the like. Moreover, the modified BR may be hydrogenated or may not be hydrogenated.

The BRs listed above may be used alone or two or more thereof may be used in combination.

A weight-average molecular weight (Mw) of the BR is preferably 300,000 or more, more preferably 350,000 or more, further preferably 400,000 or more, from the viewpoint of abrasion resistance. Moreover, it is preferably 2,000,000 or less, more preferably 1,000,000 or less, from the viewpoints of cross-linking uniformity and the like. Besides, the Mw can be calculated in terms of a standard polystyrene based on measurement values obtained by a gel permeation chromatography (GPC) (for example, GPC-8000 Series manufactured by Tosoh Corporation, detector: differential refractometer, column: TSKGEL SUPERMULTIPORE HZ-M manufactured by Tosoh Corporation).

A content of BR in 100% by mass of the rubber component constituting the first layer 6 and the second layer 7 is preferably 5% by mass or more, more preferably 10% by mass or more, further preferably 15% by mass or more, particularly preferably 20% by mass or more, from the viewpoint of chipping resistance. Moreover, it is preferably 50% by mass or less, more preferably 45% by mass or less, further preferably 40% by mass or less, particularly preferably 35% by mass or less, from the viewpoint of wet grip performance.

(Other Rubber Components)

As the rubber component according to the present disclosure, rubber components other than the above-described isoprene-based rubbers, SBRs, and BRs may be compounded. As other rubber components, a cross-linkable rubber component commonly used in the tire industry can be used, such as, for example, a diene-based rubber such as a styrene-isoprene-butadiene copolymer rubber (SIBR), a styrene-isobutylene-styrene block copolymer (SIBS), a chloroprene rubber (CR), an acrylonitrile-butadiene rubber (NBR), and a polynorbornene rubber; and a non-diene-based rubber such as a hydrogenated nitrile rubber (HNBR), a butyl rubber (IIR), an ethylene propylene rubber, a silicone rubber, a polyethylene chloride rubber, a fluororubber (FKM), an acrylic rubber (ACM), and a hydrin rubber. These other rubber components may be used alone or two or more thereof may be used in combination.

<Filler>

In the rubber composition according to the present disclosure, a filler comprising carbon black and/or silica is appropriately used. The rubber composition constituting the first layer 6 comprises silica as a filler, preferably comprises silica and carbon black, and may comprise a filler composed of silica and carbon black only. The rubber composition constituting the second layer 7 preferably comprises carbon black as a filler and may comprise a filler composed of carbon black only.

(Silica)

Silica is not particularly limited, and for example, those common in the tire industry can be used, such as silica prepared by a dry process (anhydrous silica) and silica prepared by a wet process (hydrous silica). Among them, hydrous silica prepared by a wet process is preferable because it has many silanol groups. As silica, for example, those manufactured and sold by Evonik Degussa, Solvay, Tosoh Silica Corporation, Tokuyama Corporation, etc. can be used. These silicas may be used alone or two or more thereof may be used in combination.

An average primary particle size of silica is preferably 22 nm or less, more preferably 20 nm or less, further preferably 18 nm or less, particularly preferably 16 nm or less. A lower limit of the average primary particle size is, but not particularly limited to, preferably 1 nm or more, more preferably 3 nm or more, further preferably 5 nm or more. When the average primary particle size of silica is in the above-described ranges, the dispersibility of silica can be improved more, and the reinforcing property, wet grip performance, and abrasion resistance can be further improved. Besides, the average primary particle size of silica can be calculated by observing silica with a transmission electron microscope or a scanning electron microscope, measuring 400 or more primary particles of silica observed in the field of view, and averaging them.

A nitrogen adsorption specific surface area ($N_2SA$) of silica is preferably 140 $m^2$/g or more, more preferably 150 $m^2$/g or more, further preferably 160 $m^2$/g or more, particularly preferably 170 $m^2$/g or more, from the viewpoint of securing reinforcing property and damping in the tread part. Moreover, it is preferably 350 $m^2$/g or less, more preferably 300 $m^2$/g or less, further preferably 250 $m^2$/g or less, from the viewpoints of heat generation and processability.

Besides, the $N_2SA$ of silica in the present specification is a value measured by the BET method according to ASTM D3037-93.

The average primary particle size of silica is preferably 22 nm or less, more preferably 20 nm or less, further preferably 18 nm or less, particularly preferably 16 nm or less. The lower limit of the average primary particle size is, but not particularly limited to, preferably 1 nm or more, more preferably 3 nm or more, further preferably 5 nm or more. When the average primary particle size of silica is in the above-described ranges, the dispersibility of silica can be improved more, and the reinforcing property, wet grip performance, and abrasion resistance can be further improved. Besides, the average primary particle size of silica can be calculated by observing it with a transmission electron microscope or a scanning electron microscope, measuring 400 or more primary particles of silica observed in the field of view, and averaging them.

A content of silica in the rubber composition constituting the first layer 6 based on 100 parts by mass of the rubber component is preferably 25 parts by mass or more, more preferably 45 parts by mass or more, further preferably 55 parts by mass or more, particularly preferably 65 parts by mass or more, from the viewpoint of reinforcing property. Moreover, it is preferably 120 parts by mass or less, more preferably 105 parts by mass or less, further preferably 95 parts by mass or less, particularly preferably 90 parts by mass or less, from the viewpoints of reducing the specific gravity of the rubber to realize a light weight, and improving the chipping resistance by suppressing the heat generation in the tread part. Besides, a content of silica in 100 parts by mass of the rubber component in the rubber composition constituting the second layer 7 is not particularly limited.

(Carbon Black)

Carbon black is not particularly limited, and those common in the tire industry can be used, such as GPF, FEF, HAF, ISAF, and SAF. Specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be appropriately used, and in-house synthesized products and the like can also be appropriately used. These carbon blacks may be used alone or two or more thereof may be used in combination.

A nitrogen adsorption specific surface area ($N_2SA$) of carbon black is preferably 50 $m^2$/g or more, more preferably 80 $m^2$/g or more, further preferably 100 $m^2$/g or more, from the viewpoints of weather resistance and reinforcing property. Moreover, it is preferably 250 $m^2$/g or less, more preferably 220 $m^2$/g or less, from the viewpoints of dispersibility, fuel efficiency, fracture properties, and durability. Besides, the N2SA of carbon black in the present specification is a value measured according to A Method under JIS K 6217-2 "Carbon black for rubber industry-Fundamental characteristics-Part 2: Determination of specific surface area-Nitrogen adsorption methods-Single-point procedures".

When the rubber composition constituting the first layer 6 comprises the carbon black, the content thereof is, from the viewpoints of weather resistance and reinforcing property, preferably 1 part by mass or more, more preferably 3 parts by mass or more, further preferably 5 parts by mass or more based on 100 parts by mass of the rubber component. Moreover, it is preferably 40 parts by mass or less, more preferably 30 parts by mass or less, further preferably 20 parts by mass or less, particularly preferably 10 parts by mass or less, from the viewpoint of improving the chipping resistance by suppressing the heat generation in the tread part. When the rubber composition constituting the second layer 7 comprises the carbon black, the content of thereof is preferably 20 to 100 parts by mass, more preferably 25 to 80 parts by mass, further preferably 30 to 60 parts by mass based on 100 parts by mass of the rubber component.

The filler according to the present disclosure may include fillers other than silica and carbon black. As fillers other than silica and carbon black, any filler commonly used in the tire industry can be used, and examples thereof include, for example, aluminum hydroxide, alumina (aluminum oxide), clay, calcium carbonate, mica, and the like.

A total content of fillers in the rubber composition constituting the first layer 6 based on 100 parts by mass of the rubber component is 60 parts by mass or more, preferably 65 parts by mass or more, more preferably 70 parts by mass or more, further preferably 75 parts by mass or more, from the viewpoint of reinforcing property. Moreover, it is preferably 130 parts by mass or less, more preferably 115 parts by mass or less, further preferably 100 parts by mass or less, particularly preferably 95 parts by mass or less, from the viewpoints of reducing the specific gravity of the rubber to realize a light weight, and improving the chipping resistance by suppressing the heat generation in the tread part. A total content of fillers in the rubber composition constituting the second layer 7 based on 100 parts by mass of the rubber component is preferably 20 to 100 parts by mass, more preferably 25 to 80 parts by mass, further preferably 30 to 60 parts by mass.

A content of silica in 100% by mass of the filler in the rubber composition constituting the first layer 6 is preferably 30% by mass or more, more preferably 50% by mass or more, further preferably 70% by mass or more, particularly preferably 80% by mass or more. Moreover, the content of silica is preferably 99% by mass or less, more preferably 97% by mass or less, further preferably 95% by mass or less.

<Silane Coupling Agent>

In the rubber composition according to the present disclosure, a silane coupling agent is used in combination with silica. The silane coupling agent is not particularly limited, and any silane coupling agent conventionally used in combination with silica in the tire industry can be used, and examples thereof include, for example, a mercapto-based silane coupling agent as follows; a sulfide-based silane coupling agent such as bis(3-triethoxysilylpropyl)disulfide and bis(3-triethoxysilylpropyl)tetrasulfide; a thioester-based silane coupling agent such as 3-octanoylthio-1-propyltriethoxysilane, 3-hexanoylthio-1-propyltriethoxysilane, and 3-octanoylthio-1-propyltrimethoxysilane; a vinyl-based silane coupling agent such as vinyltriethoxysilane and vinyltrimethoxysilane; an amino-based silane coupling agent such as 3-aminopropyltriethoxysilane, 3-aminopropyltrimethoxysilane, and 3-(2-aminoethyl)aminopropyltriethoxysilane; a glycidoxy-based silane coupling agent such as γ-glycidoxypropyltriethoxysilane and γ-glycidoxypropyltrimethoxysilane; a nitro-based silane coupling agent such as 3-nitropropyltrimethoxysilane and 3-nitropropyltriethoxysilane; a chloro-based silane coupling agent such as 3-chloropropyltrimethoxysilane and 3-chloropropyltriethoxysilane, and the like. Among them, a sulfide-based silane coupling agent and/or a mercapto-based silane coupling agent are preferable, and a mercapto-based silane coupling agent is more preferable. These silane coupling agents may be used alone or two or more thereof may be used in combination.

The mercapto-based silane coupling agent is preferably a compound represented by the following formula (1) and/or a compound comprising a bond unit A represented by the following formula (2) and a bond unit B represented by the following formula (3).

(Wherein, each of $R^{101}$, $R^{102}$, and $R^{103}$ independently represents a group represented by a $C_{1-12}$ alkyl, a $C_{1-12}$ alkoxy, or a $-O-(R^{111}-O)_z-R^{112}$ (Each of z $R^{111}$ s independently represents a divalent hydrocarbon group having 1 to 30 carbon atoms; $R^{112}$ represents a $C_{1-30}$ alkyl, a $C_{2-30}$ alkenyl, a $C_{6-30}$ aryl, or a $C_{7-30}$ aralkyl; z represents an integer of 1 to 30); and $R^{104}$ represents a $C_{1-6}$ alkylene.)

(Wherein, x represents an integer of 0 or more; y represents an integer of 1 or more; $R^{201}$ represents a $C_{1-30}$ alkyl, a $C_{2-30}$ alkenyl, or a $C_{2-30}$ alkynyl, which may be substituted with a hydrogen atom, a halogen atom, hydroxyl or carboxyl; $R^{202}$ represents a $C_{1-30}$ alkylene, a $C_{2-30}$ alkenylene, or a $C_{2-30}$ alkynylene; wherein $R^{201}$ and $R^{202}$ may form a ring structure.)

Examples of the compound represented by formula (1) include 3-mercaptopropyltrimethoxysilane, 3-mercaptopropyltriethoxysilane, 2-mercaptoethyltrimethoxysilane, 2-mercaptoethyltriethoxysilane, and a compound represented by formula (4) below (Si363 manufactured by Evonik Degussa), and the compound represented by formula (4) below can be appropriately used. They may be used alone or two or more thereof may be used in combination.

(4)

Examples of the compound comprising the bond unit A represented by formula (2) and the bond unit B represented by formula (3) include NXT-Z30, NXT-Z45, NXT-Z60, and NXT-Z100 manufactured by Momentive Performance Materials, and the like. They may be used alone or two or more thereof may be used in combination.

A content of the silane coupling agent based on 100 parts by mass of the rubber component is preferably 2.0 parts by mass or more, more preferably 3.0 parts by mass or more, further preferably 4.0 parts by mass or more, particularly preferably 4.8 parts by mass or more, from the viewpoints of enhancing the dispersibility of silica and improving the fuel efficiency. Moreover, it is preferably 20 parts by mass or less, more preferably 15 parts by mass or less, further preferably 12 parts by mass or less, particularly preferably 10 parts by mass or less, from the viewpoint of preventing deterioration of chipping resistance.

A content of the silane coupling agent based on 100 parts by mass of silica is preferably 2.0 parts by mass or more, more preferably 4.0 parts by mass or more, further preferably 6.0 parts by mass or more, particularly preferably 8.0 parts by mass or more, from the viewpoint of enhancing the dispersibility of silica. Moreover, it is preferably 30 parts by mass or less, more preferably 20 parts by mass or less, further preferably 15 parts by mass or less, from the viewpoint of preventing deterioration of abrasion resistance.

<Vulcanization Accelerator>

The rubber composition constituting the first layer 6 comprises, as an essential component, a thiuram-based vulcanization accelerator as a vulcanization accelerator and may comprise vulcanization accelerators other than the thiuram-based vulcanization accelerator. As vulcanization accelerators other than the thiuram-based vulcanization accelerator, any filler commonly used in the tire industry can be used, and examples thereof include, for example, sulfenamide-based, thiazole-based, thiourea-based, guanidine-based, dithiocarbamic acid-based, aldehyde-amine-based or aldehyde-ammonia-based, imidazoline-based, xanthate-based vulcanization accelerators, and the like. Among them, one or more selected from the group consisting of sulfenamide-based, thiazole-based, and guanidine-based vulcanization accelerators are preferable, and a sulfenamide-based vulcanization accelerator is more preferable. The rubber composition constituting the second layer 7 preferably comprises one or more selected from the group consisting of sulfenamide-based, thiazole-based, and guanidine-based vulcanization accelerators as vulcanization accelerators. These vulcanization accelerators may be used alone or two or more thereof may be used in combination.

A vulcanization accelerator to be compounded in the rubber composition constituting the first layer 6 may comprises a thiuram-based vulcanization accelerator and one or more selected from the group consisting of sulfenamide-based, thiazole-based, and guanidine-based vulcanization accelerators; may be composed of thiuram-based vulcanization accelerator and one or more selected from the group consisting of sulfenamide-based, thiazole-based, and guanidine-vulcanization accelerators only; may comprises a thiuram-based vulcanization accelerator and a sulfenamide-based vulcanization accelerator; and may be composed of a thiuram-based vulcanization accelerator and a sulfenamide-based vulcanization accelerator only.

Examples of the thiuram-based brewing accelerator include, for example, tetramethylthiuram disulfide (TMTD), tetrabenzylthiuram disulfide (TBzTD), tetrakis(2-ethylhexyl)thiuram disulfide (TOT-N), and the like. Among them, tetrabenzylthiuram disulfide (TBzTD) is preferable. The thiuram-based vulcanization accelerator may be used alone or two or more thereof may be used in combination.

Examples of the sulfenamide-based vulcanization accelerator include, for example, N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and the like. Among them, N-cyclohexyl-2-benzothiazolylsulfeneamide (CBS) is preferable. The sulfenamide-based vulcanization accelerator may be used alone or two or more thereof may be used in combination.

Examples of the thiazole-based vulcanization accelerator include, for example, 2-mercaptobenzothiazole, cyclohexylamine salt of 2-mercaptobenzothiazole, di-2-benzothiazolyl disulfide, and the like. Among them, 2-mercaptobenzothiazole is preferable. The thiazole-based vulcanization accelerator may be used alone or two or more thereof may be used in combination.

Examples of the guanidine-based sulfide accelerator include, for example, 1,3-diphenylguanidine (DPG), 1,3-di-o-tolylguanidine, 1-o-tolylbiguanide, di-o-tolylguanidine salt of dicatechol borate, 1,3-di-o-cumenylguanidine, 1,3-di-o-biphenylguanidine, 1,3-di-o-cumenyl-2-propionylguanidine, and the like. Among them, 1,3-diphenylguanidine (DPG) is preferable. The guanidine-based vulcanization accelerator may be used alone or two or more thereof may be used in combination.

A content of the thiuram-based vulcanization accelerator in the rubber composition constituting the first layer 6 based on 100 parts by mass of the rubber component is preferably 0.1 parts by mass or more, more preferably 0.2 parts by mass or more, from the viewpoints of fuel efficiency and steering stability. Moreover, it is preferably 2.0 parts by mass or less, more preferably 1.5 parts by mass or less, further preferably 1.0 part by mass or less, particularly preferably 0.8 parts by mass or less, from the viewpoint of steering stability.

A total content of the vulcanization accelerators in the rubber composition constituting the first layer 6 and the second layer 7 based on 100 parts by mass of the rubber component is preferably 1.0 part by mass or more, preferably 1.5 parts by mass or more, further preferably 2.0 parts by mass or more. Moreover, the total content of the vulcanization accelerators based on 100 parts by mass of the rubber component is preferably 8.0 parts by mass or less, more preferably 7.0 parts by mass or less, further preferably 6.0 parts by mass or less, particularly preferably 5.0 parts by mass or less. When the content of the vulcanization accelerators is within the above-described ranges, breaking strength and elongation at break tend to be able to be secured.

<Vulcanizing Agent>

The rubber composition according to the present disclosure preferably comprises a vulcanizing agent. Sulfur is appropriately used as the vulcanizing agent. As sulfur, a powdered sulfur, an oil-treated sulfur, a precipitated sulfur, a colloidal sulfur, an insoluble sulfur, a highly dispersible sulfur, and the like can be used.

A content of sulfur when compounded as the vulcanizing agent based on 100 parts by mass the rubber component is preferably 0.1 parts by mass or more, more preferably 0.3 parts by mass or more, further preferably 0.5 parts by mass or more, from the viewpoint of securing a sufficient vulcanization reaction. Moreover, it is preferably 5.0 parts by mass or less, more preferably 4.0 parts by mass or less, further preferably 3.0 parts by mass or less, from the viewpoint of preventing deterioration. Besides, a content of a vulcanizing agent when using an oil-containing sulfur as the vulcanizing agent shall be a total content of pure sulfur amounts comprised in the oil-containing sulfur.

Examples of vulcanizing agents other than sulfur include, for example, alkylphenol-sulfur chloride condensate, 1,6-bis(N,N'-dibenzylthiocarbamoyldithio)hexane, and the like. As these vulcanizing agents other than sulfur, those commercially available from Taoka Chemical Co., Ltd., LANXESS, Flexsys, etc. can be used.

<Other Compounding Agents>

The rubber composition according to the present disclosure can appropriately comprise compounding agents commonly used in the conventional tire industry such as, for example, a resin component, oil, wax, processing aid, an antioxidant, stearic acid, and zinc oxide, in addition to the above-described components.

The resin component is not particularly limited, and examples thereof include a petroleum resin, a terpene-based resin, a rosin-based resin, a phenol-based resin, and the like which are commonly used in the tire industry, and they may be hydrogenated. These resin components may be used alone or two or more thereof may be used in combination.

In the present specification, a "C5-based petroleum resin" refers to a resin obtained by polymerizing a C5 fraction. Examples of the C5 fraction include, for example, a petroleum fraction equivalent to 4 to 5 carbon atoms such as cyclopentadiene, pentene, pentadiene, and isoprene. As the C5-based petroleum resin, a cyclopentadiene-based resin is appropriately used. As the cyclopentadiene-based resin, a dicyclopentadiene resin (DCPD resin), a cyclopentadiene resin, a methylcyclopentadiene resin (non-hydrogenated cyclopentadiene-based resin), and those obtainable by hydrogenating these cyclopentadiene-based resins (hydrogenated cyclopentadiene-based resins). As the cyclopentadiene-based resin, for example, those commercially available from Exxon Mobil Corporation, etc. can be used.

In the present specification, an "aromatic-based petroleum resin" refers to a resin obtained by polymerizing a C9 fraction, and may be hydrogenated or modified. Examples of the C9 fraction include, for example, a petroleum fraction equivalent to 8 to 10 carbon atoms such as vinyltoluene, alkylstyrene, indene, and methyl indene. As specific examples of the aromatic-based petroleum resin, for example, a coumarone indene resin, a coumarone resin, an indene resin, and an aromatic vinyl-based resin are appropriately used. As the aromatic vinyl-based resin, a homopolymer of α-methylstyrene or styrene or a copolymer of α-methylstyrene and styrene is preferable, and a copolymer of α-methylstyrene and styrene more preferably, because it is economical, easy to be processed, and good in heat generation. As the aromatic vinyl-based resin, for example, those commercially available from Kraton Corporation, Eastman Chemical Company, etc. can be used.

In the present specification, a "C5-C9-based petroleum resin" refers to a resin obtained by copolymerizing the C5 fraction and the C9 fraction, and may be hydrogenated or modified. Examples of the C5 fraction and the C9 fraction include the above-described petroleum fractions. As the C5-C9-based petroleum resin, for example, those commercially available from Tosoh Corporation, Zibo Luhua Hongjin New Material Co., Ltd., etc. can be used.

Examples of the terpene-based resin include a polyterpene resin consisting of at least one selected from terpene compounds such as α-pinene, β-pinene, limonene, and dipentene; an aromatic-modified terpene resin made from the terpene compound and an aromatic compound; a terpene phenol resin made from a terpene compound and a phenol-based compound; and those obtainable by hydrogenating these terpene-based resins (hydrogenated terpene-based resins). Examples of the aromatic compound used as a raw material for the aromatic-modified terpene resin include, for example, styrene, α-methylstyrene, vinyltoluene, divinyltoluene, and the like. Examples of the phenol-based compound used as a raw material for the terpene phenol resin include, for example, phenol, bisphenol A, cresol, xylenol, and the like. As the terpene-based resin, for example, those commercially available from Yasuhara Chemical Co., Ltd., etc. can be used.

The rosin-based resin is not particularly limited, and examples thereof include, for example, a natural resin rosin, a modified rosin resin, and the like. As the rosin-based resin, for example, those commercially available from Arakawa Chemical Industries, Ltd., Harima Chemicals Group, Inc., etc. can be used.

The phenol-based resin is not particularly limited, and examples thereof include a phenolformaldehyde resin, an alkylphenolformaldehyde resin, an alkylphenol acetylene resin, an oil-modified phenolformaldehyde resin, and the like.

A softening point of the resin component (particularly an aromatic ring-containing resin) is preferably 90° C. or higher, more preferably 95° C. or higher, further preferably 100° C. or higher, from the viewpoint of wet grip performance. Moreover, it is preferably 160° C. or lower, more preferably 150° C. or lower, further preferably 140° C. or lower, from the viewpoints of processability and improvement in dispersibility of a rubber component with a filler. Besides, in the present specification, the softening point can be defined as a temperature at which a sphere drops when the softening point specified in JIS K 6220-1: 2001 is measured with a ring and ball softening point measuring device.

When the rubber composition comprises the resin component, the content thereof is, from the viewpoint of wet grip performance, preferably 1 part by mass or more, more preferably 5 parts by mass or more, further preferably 10 parts by mass or more based on 100 parts by mass of the rubber component. Moreover, it is preferably 60 parts by mass or less, more preferably 50 parts by mass or less, further preferably 40 parts by mass or less, particularly preferably 30 parts by mass or less, from the viewpoint of suppressing heat generation.

Examples of oil include, for example, a process oil, a vegetable oil and fat, an animal oil and fat, and the like. Examples of the process oil include a paraffin-based process oil, a naphthene-based process oil, an aromatic-based process oil, and the like. Moreover, as an environmental measure, a process oil having a low content of a polycyclic aromatic compound (PCA) can also be used. Examples of the process oil having a low content of a PCA include a mild extraction solution (MES), a treated distillate aromatic extract (TDAE), a heavy naphthene-based oil, and the like.

When the rubber composition comprises the oil, the content thereof is, from the viewpoint of processability, preferably 1 part by mass or more, more preferably 3 parts by mass or more, further preferably 5 parts by mass or more based on 100 parts by mass of the rubber component.

Moreover, it is preferably 100 parts by mass or less, more preferably 80 parts by mass or less, further preferably 60 parts by mass or less, from the viewpoint of abrasion resistance. Besides, in the present specification, the content of oil also includes an amount of oil contained in an oil-extended rubber.

Wax is not particularly limited, and those commonly used in the tire industry can be appropriately used, and examples thereof include, for example, a petroleum-based wax, a mineral-based wax, a synthetic wax, and the like. Among them, a petroleum-based wax is preferable. Examples of the petroleum-based wax include, for example, a paraffin wax, a microcrystalline wax, and the like. These waxes may be used alone or two or more thereof may be used in combination. As wax, for example, those commercially available from Ouchi Shinko Chemical Industrial Co., Ltd., Nippon Seiro Co., Ltd., Paramelt B.V., etc. can be used.

When the rubber composition comprises the wax, the content thereof is, from the viewpoint of weather resistance of a rubber, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of whitening of a tire due to bloom.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. These processing aids may be used alone or two or more thereof may be used in combination. As processing aid, for example, those commercially available from Schill+Seilacher GmbH, Performance Additives, etc. can be used.

When the rubber composition comprises the processing aid, the content thereof is, from the viewpoint of exhibiting an effect of improving processability, preferably 0.5 parts by mass or more, more preferably 1 part by mass or more based on 100 parts by mass of the rubber component. Moreover, it is preferably 10 parts by mass or less, more preferably 8 parts by mass or less, from the viewpoints of abrasion resistance and breaking strength.

The antioxidant is not particularly limited, and examples thereof include, for example, each amine-based, quinoline-based, quinone-based, phenol-based, and imidazole-based compound, and an antioxidant such as a carbamate metal salt, preferably a phenylenediamine-based antioxidant such as N-(1,3-dimethylbutyl)-N'-phenyl-p-phenylenediamine, N-isopropyl-N'-phenyl-p-phenylenediamine, N, N'-diphenyl-p-phenylenediamine, N,N'-di-2-naphthyl-p-phenylenediamine, and N-cyclohexyl-N'-phenyl-p-phenylenediamine, and a quinoline-based antioxidant such as 2,2,4-trimethyl-1,2-dihydroquinolin polymer and 6-ethoxy-2,2,4-trimethyl-1,2-dihydroquinolin. These antioxidants may be used alone or two or more thereof may be used in combination.

When the rubber composition comprises the antioxidant, the content thereof is, from the viewpoint of ozone crack resistance of a rubber, preferably 0.5 parts by mass or more, more preferably 1 part by mass or more based on 100 parts by mass of the rubber component. Moreover, it is preferably 10 parts by mass or less, more preferably 5 parts by mass or less, from the viewpoints of abrasion resistance and wet grip performance.

When the rubber composition comprises the stearic acid, the content thereof is, from the viewpoint of processability, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of vulcanization rate.

When the rubber composition comprises the zinc oxide, the content thereof is, from the viewpoint of processability, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of abrasion resistance.

[Manufacturing Rubber Composition and Tire]

The rubber composition according to the present disclosure can be manufactured by a known method. For example, it can be manufactured by kneading each of the above-described components using a rubber kneading apparatus such as an open roll and a closed type kneader (Bunbury mixer, kneader, etc.).

The kneading step comprises, for example, a base kneading step of kneading compounding agents and additives other than vulcanizing agents and vulcanization accelerators, and a final kneading (F kneading) step of adding vulcanizing agents and vulcanization accelerators to the kneaded product obtained in the base kneading step and kneading them. Furthermore, the base kneading step can be divided into a plurality of steps, if desired.

Kneading conditions are not particularly limited, and for example, a method of kneading at a discharge temperature of 150 to 170° C. for 3 to 10 minutes in the base kneading step and kneading at 70 to 110° C. for 1 to 5 minutes in the final kneading step is exemplified. Vulcanization conditions are not particularly limited, and for example, a method of vulcanizing at 150 to 200° C. for 10 to 30 minutes is exemplified.

The tire according to the present disclosure comprises a tread and may be a pneumatic tire or a non-pneumatic tire. Moreover, examples of the pneumatic tire include a tire for a passenger car, a tire for a truck/bus, a tire for a motorcycle, a high-performance tire, and the like. Besides, the high-performance tire in the present specification is a tire having a particularly good grip performance and is a concept including a racing tire used for a racing vehicle.

A tire comprising a tread comprising the first layer 6 and the second layer 7 can be manufactured by a usual method using the above-described rubber composition. That is, the tire can be manufactured by extruding unvulcanized rubber compositions compounded with each of the above-described components based on the rubber component as necessary into shapes of the first layer 6 and the second layer 7 with an extruder equipped with a mouthpiece having a predetermined shape, attaching them together with other tire members on a tire molding machine, and molding them by a usual method to form an unvulcanized tire, followed by heating and pressurizing this unvulcanized tire in a vulcanizing machine.

Example

Although the present disclosure will be described based on Examples, it is not limited to Examples.

Various chemicals used in Examples and Comparative examples are shown below.

NR: TSR20

SBR1: Modified solution-polymerized SBR manufactured in Manufacturing example 1 which will be described later (styrene content: 30% by mass, vinyl content: 52 mol %, Mw: 250,000, non-oil-extended product)

SBR2: Modified solution-polymerized SBR manufactured in Manufacturing example 2 which will be described later (styrene content: 38% by mass, vinyl content: 39 mol %, Mw: 800,000, oil-extended product in which 25 parts by weight of an oil component is added to 100 parts by weight of a SBR)

BR1: Nipol BR1220 (BR obtained by polymerizing butadiene in presence of a cobalt-based catalyst, cis content: 96% by mass, Tg: −105° C., Mw: 460,000) manufactured by Zeon Corporation BR2: CB24 (BR synthesized using an Nd-based catalyst, vinyl content: 0.7 mol %, cis content: 96% by mass, Mw: 500,000) manufactured by LANXESS Carbon black 1: VULCAN10H (N134, $N_2SA$: 144 $m^2/g$) manufactured by Cabot Japan K.K.

Carbon black 2: N351 ($N_2SA$: 71 $m^2/g$) manufactured by Mitsubishi Chemical Corporation Silica 1: ULTRASIL VN3 ($N_2SA$: 175 $m^2/g$, average primary particle size: 18 nm) manufactured by Evonik Degussa Silica 2: ULTRASIL 9100GR ($N_2SA$: 230 $m^2/g$, average primary particle size: 15 nm) manufactured by Evonik Degussa Silane coupling agent: NXT-Z45 (mercapto-based silane coupling agent) manufactured by Momentive Performance Materials Oil: VivaTec 400 (TDAE oil) manufactured by H&R Group Wax: OZOACE 0355 manufactured by Nippon Seiro Co., Ltd.

Antioxidant: Antigen 6C (N-(1,3-dimethylbutyl)-N'-phenyl-p-phenylenediamine) manufactured by Sumitomo Chemical Co., Ltd.

Stearic acid: Bead stearic acid "Tsubaki" manufactured by NOF CORPORATION

Zinc oxide: Zinc oxide No. 1 manufactured by Mitsui Mining & Smelting Co., Ltd.

Sulfur: Powdered sulfur manufactured by Karuizawa Iou Kabushiki Kaisha

Insoluble sulfur: Seimi sulfur (containing 10% oil) manufactured by Nippon Kanryu Industry Co., Ltd.

Vulcanization accelerator 1: Nocceler CZ (N-cyclohexyl-2-benzothiazolylsulfenamide) manufactured by Ouchi Shinko Chemical Industrial Co., Ltd.

Vulcanization accelerator 2: TBzTD (tetrabenzylthiuram disulfide) manufactured by Performance Additives Manufacturing Example 1: Synthesis of SBR1

Cyclohexane, tetrahydrofuran, styrene, and 1,3-butadiene were charged into a nitrogen-substituted autoclave reactor. The temperature of the contents of the reactor was adjusted to 20° C., and n-butyllithium was added to initiate polymerization. Polymerization was performed under an adiabatic condition, and the temperature reached 85° C. of the maximum temperature. When a polymerization conversion rate reached 99%, 1,3-butadiene was added, and after further polymerization for 5 minutes, N,N-bis(trimethylsilyl)-3-aminopropyltrimethoxysilane was added as a modifying agent to perform reaction. After completion of the polymerization reaction, 2,6-di-tert-butyl-p-cresol was added. Next, the mixed product was removed of solvent by steam stripping and dried by a heat roll which temperature was adjusted to 110° C. to obtain a SBR 1.

Manufacturing Example 2: Synthesis of SBR2

Two autoclaves having an inlet at the bottom and an outlet at the top and equipped with a stirrer and a jacket are connected in series as reactors (internal volume: 10 L), and butadiene, styrene, and cyclohexane were mixed in each predetermined ratio under a nitrogen atmosphere. This mixed solution was mixed with n-butyllithium in a static mixer to remove impurities via a dehydration column filled with activated alumina, and then continuously supplied from the bottom of the first reactor. Furthermore, 2,2-bis(2-oxolanyl)propane as a polar substance and n-butyllithium as a polymerization initiator were continuously supplied from the bottom of the first reactor at a predetermined rate, respectively, and a temperature inside the reactor was kept at 95° C. The polymer solution was continuously taken out from the top of the reactor and supplied to the second reactor. A temperature of the second reactor was kept at 95° C., and a mixture of tetraglycidyl-1,3-bisaminomethylcyclohexane (monomer) and an oligomer component as a modifying agent was continuously added as a solution diluted by 1,000 times of cyclohexane at a predetermined rate to perform a modifying reaction. This polymer solution was continuously taken out from the reactor, and 2,6-di-tert-butyl-p-cresol was continuously added with the static mixer. Next, 25 parts by mass of an extended oil (NC-140 manufactured by JXTG Nippon Oil & Energy Corporation) based on 100 parts by mass of the polymer was added, and then the mixed product was removed of solvent by steam stripping and dried by a heat roll which temperature was adjusted to 110° C. to obtain a SBR 2.

Examples and Comparative Examples

According to the compounding formulations shown in Table 1, using a 1.7 L closed Banbury mixer, all chemicals other than sulfur and vulcanization accelerators were kneaded until a discharge temperature reached 150 to 160° C. for 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was extruded into shapes of a first layer (thickness: 5.0 mm) and a second layer (thickness: 2.0 mm) of a tread with an extruder equipped with a mouthpiece having a predetermined shape and attached together with other tire members to produce an unvulcanized tire comprising a tread part consisting of two rubber layers, followed by press-vulcanized for 12 minutes under a condition of 170° C. to obtain each test tire described in Table 2 (size: 205/65R15, rim: 15×6JJ, internal pressure: 230 kPa). Besides, a groove depth (the deepest part) of a circumferential groove was set to be 5.6 mm, and a groove depth (the deepest part) of a lateral groove having no opening to the circumferential groove at both ends of the lateral groove was set to be 6.0 mm.

<Breaking Energy after Heat Aging>

A No. 3 dumbbell type test piece composed of each test vulcanized rubber composition was subjected to heat aging under an atmosphere of 80° C. for 7 days, and then a tensile test was performed under an atmosphere of 130° C. in accordance with JIS K 6251 "Rubber, vulcanized or thermoplastics-Determination of tensile stress-strain properties". Strength at break (TB) (MPa) and elongation at break (EB) (%) were measured to calculate breaking energy by the following equation. The result shows that the higher the numerical value is, the better the chipping resistance is.

(Breaking energy)=($TB \times EB$)/2

<Viscoelasticity Test>

Vulcanized rubbers were collected from the first and second layers of the tread of each test tire and cut into a width of 4 mm, a length of 40 mm, and a thickness of 2 mm, to measure a loss tangent (tan δ) and a complex elastic modulus E* (MPa) under a condition of a temperature of 70° C., an initial strain of 10%, a dynamic strain of 2%, and a frequency of 10 Hz using a viscoelastic spectrometer manufactured by Iwamoto Seisakusho Co., Ltd.

<Fuel Efficiency>

Using a rolling resistance tester, a rolling resistance when test tires were run under a rim of 15×6JJ, an internal pressure of 230 kPa, a load of 3.43 kN, and a speed at 80 km/h was measured, and the inverse value was displayed as an index as Comparative example 1 being 100. The result shows that the higher the numerical value is, the lower the rolling resistance is and the better the fuel efficiency is.

<Chipping Resistance>

Each test tire was incorporated into a normal rim, filled with air to a normal internal pressure, and then mounted to a vehicle, and the vehicle was made run on a rough road at a speed of 50 km/hour for 4 hours. After the running, rubber chip of 2 mm or more generated on the surface of the tire was counted, and the number of chipping was calculated for each tire, to calculate a chipping resistance index by the following equation. The result shows that the higher the numerical value is, the less the rubber chipping is and the better the chipping resistance is.

(Chipping resistance index)=(number of chipping in Comparative example 1)/(number of chipping of each test tire)×100

<Steering Stability>

Each test tire was mounted to four wheels of an FF passenger vehicle with a displacement of 2000 cc, and the actual vehicle was made run on a test course having a dry asphalt surface. Handling characteristics were evaluated based on each feeling at the time of running straight, changing lanes, and accelerating/decelerating when running at 120 km/h by a test driver. Evaluation was performed using an integer value of 1 to 10 points, and a total score by 10 test drivers was calculated based on evaluation criteria in which the higher the score is, the better the handling characteristics is. The total score in Comparative example 1 was converted into a reference value (100), and an evaluation result of each test tire was displayed as an index so as to be proportional to the total score.

A performance target value of an overall performance of fuel efficiency, chipping resistance, and steering stability (a total sum of fuel efficiency index, chipping resistance index, and steering stability index) is more than 300.

TABLE 1

| | First layer | | | | | | | | | | | | Second layer |
|---|---|---|---|---|---|---|---|---|---|---|---|---|---|
| | A1 | A2 | A3 | A4 | A5 | A6 | A7 | A8 | A9 | A10 | A11 | A12 | B1 |
| Compounding amount (part by mass) | | | | | | | | | | | | | |
| NR | 10 | 10 | 10 | 10 | 10 | — | 30 | 10 | 10 | 15 | 20 | 15 | 70 |
| SBR 1 | 45 | 45 | 45 | 45 | 45 | 55 | 50 | 45 | 45 | 40 | 35 | 40 | — |
| SBR 2 | 25 | 25 | 25 | 25 | 25 | 25 | 25 | 25 | 25 | 25 | 25 | 25 | — |
| (Oil content) | (5) | (5) | (5) | (5) | (5) | (5) | (5) | (5) | (5) | (5) | (5) | (5) | |
| BR 1 | 25 | 25 | 25 | 25 | 25 | 25 | — | 25 | 25 | 25 | 25 | 25 | — |
| BR 2 | — | — | — | — | — | — | — | — | — | — | — | — | 30 |
| Carbon black 1 | 5.0 | 10 | 25 | 75 | 5.0 | 5.0 | 5.0 | 5.0 | 5.0 | 5.0 | 5.0 | 5.0 | — |
| Carbon black 2 | — | — | — | — | — | — | — | — | — | — | — | — | 40 |
| Silica 1 | 70 | 65 | 50 | — | 50 | 70 | 70 | 70 | 70 | 70 | 70 | — | — |
| Silica 2 | — | — | — | — | — | — | — | — | — | — | — | 70 | — |
| Silane coupling agent | 6.0 | 5.0 | 4.0 | — | 4.0 | 6.0 | 6.0 | 6.0 | 6.0 | 6.0 | 6.0 | 6.0 | — |
| Oil | 2.0 | 2.0 | 2.0 | 2.0 | 2.0 | 2.0 | 2.0 | 2.0 | 2.0 | 2.0 | 2.0 | 2.0 | 7.0 |
| Wax | 2.0 | 2.0 | 2.0 | 2.0 | 2.0 | 2.0 | 2.0 | 2.0 | 2.0 | 2.0 | 2.0 | 2.0 | 2.0 |
| Antioxidant | 2.0 | 2.0 | 2.0 | 2.0 | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 | 2.0 | 2.0 | 2.0 |
| Sulfur | 1.5 | 1.5 | 1.5 | 1.5 | 1.5 | 1.5 | 1.5 | 1.5 | 1.5 | 1.5 | 1.5 | 1.5 | — |
| Insoluble sulfur | — | — | — | — | — | — | — | — | — | — | — | — | 2.0 |
| Vulcanization accelerator 1 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator 2 | — | — | — | — | 0.2 | 0.2 | 0.2 | 0.2 | 1.0 | 0.2 | 1.0 | 0.2 | — |
| Physical properties | | | | | | | | | | | | | |
| Breaking energy | 1100 | 1150 | 1230 | 1330 | 1000 | 950 | 1100 | 1100 | 1050 | 1250 | 1400 | 1350 | 1300 |
| 70° C. tan δ | 0.10 | 0.11 | 0.12 | 0.17 | 0.07 | 0.10 | 0.11 | 0.10 | 0.10 | 0.10 | 0.10 | 0.11 | 0.05 |
| 70° C. E* (MPa) | 7.0 | 7.5 | 8.0 | 10.0 | 4.0 | 7.5 | 7.5 | 7.5 | 8.5 | 7.0 | 8.5 | 9.0 | 4.0 |

TABLE 2

|  | Comparative example | | | | | | | Example | | | | |
| --- | --- | --- | --- | --- | --- | --- | --- | --- | --- | --- | --- | --- |
|  | 1 | 2 | 3 | 4 | 5 | 6 | 7 | 1 | 2 | 3 | 4 | 5 |
| Compounding for first layer | A1 | A2 | A3 | A4 | A5 | A6 | A7 | A8 | A9 | A10 | A11 | A12 |
| Compounding for second layer | B1 | B1 | B1 | B1 | B1 | B1 | B1 | B1 | B1 | B1 | B1 | B1 |
| Evaluation | | | | | | | | | | | | |
| Fuel efficiency | 100 | 90 | 75 | 55 | 130 | 100 | 90 | 102 | 105 | 106 | 110 | 90 |
| Chipping resistance | 100 | 110 | 120 | 130 | 90 | 85 | 100 | 115 | 130 | 115 | 130 | 125 |
| Steering stability | 100 | 105 | 112 | 121 | 60 | 110 | 110 | 100 | 95 | 114 | 127 | 130 |
| Overall performance | 300 | 305 | 307 | 306 | 280 | 295 | 300 | 317 | 330 | 335 | 367 | 345 |

From the results in Tables 1 and 2, it can be found that the tire of the present disclosure, in which a predetermined rubber component, a predetermined filler, a silane coupling agent, and a thiuram-based vulcanization accelerator in a predetermined ratio are compounded in a rubber layer constituting a tread surface and a breaking energy measured after subjecting the rubber layer to thermal deterioration is set to be within a predetermined range, has an improved overall performance of fuel efficiency, chipping resistance, and steering stability and a good balance of fuel efficiency, chipping resistance, and steering stability.

EXPLANATION OF NUMERALS

1. Circumferential groove
2. Land part
3. Tread surface
4. Extension line of land part
5. Extension of the deepest part of groove bottom of circumferential groove
6. First layer
7. Second layer
8. Extension line of the outermost part of second layer

What is claimed is:

1. A tire comprising a tread,
wherein the tread has land parts partitioned by a plurality of circumferential grooves,
wherein at least one of the land parts comprises one or more lateral grooves having no opening to any of the circumferential grooves at both ends of the lateral groove, and a groove depth of the deepest part of the lateral groove is 80% or more of a thickness of the entire tread part,
wherein a groove depth of the deepest part of the lateral groove is larger than a groove depth of the deepest part of the circumferential groove,
wherein the tread has at least one rubber layer,
wherein a first rubber layer constituting the tread surface is composed of a rubber composition comprising a rubber component, a filler, a silane coupling agent, and a thiuram-based vulcanization accelerator,
wherein the rubber component constituting the first rubber layer comprises an isoprene-based rubber, a styrene-butadiene rubber, and a butadiene rubber,
wherein the filler comprised in the rubber composition constituting the first rubber layer comprises silica,
wherein the rubber composition constituting the first rubber layer comprises 60 parts by mass or more of the filler based on 100 parts by mass of the rubber component, and
wherein a breaking energy measured after subjecting the rubber composition constituting the first rubber layer to thermal deterioration at 80° C. for 7 days is 1,000 or more.

2. The tire of claim 1, wherein the rubber composition constituting the first rubber layer comprises 65 parts by mass or more of the filler based on 100 parts by mass of the rubber component.

3. The tire of claim 1, wherein a content of silica in the filler comprised in the rubber composition constituting the first rubber layer is 30 to 95% by mass.

4. The tire of claim 1, wherein the rubber composition constituting the first rubber layer comprises 0.1 parts by mass or more of a thiuram-based vulcanization accelerator based on 100 parts by mass of the rubber component.

5. The tire of claim 1, wherein the rubber composition constituting the first rubber layer comprises 4.8 parts by mass or more of a silane coupling agent based on 100 parts by mass of the rubber component.

6. The tire of claim 1, wherein the silane coupling agent comprised in the rubber composition constituting the first rubber layer is a mercapto-based silane coupling agent.

7. The tire of claim 1, wherein the rubber component constituting the first rubber layer comprises 10 to 20% by mass of an isoprene-based rubber, 45 to 65% by mass of a styrene-butadiene rubber, and 25 to 35% by mass of a butadiene rubber.

8. The tire of claim 1,
wherein the tread has a second rubber layer adjacent to inside in a radial direction of the first rubber layer,
wherein the second rubber layer is composed of a rubber composition comprising a rubber component and carbon black,
wherein the rubber component constituting the second rubber layer comprises an isoprene-based rubber, and
wherein tan δ of the rubber composition constituting the first rubber layer at 70° C. is larger than tan δ of the rubber composition constituting the second rubber layer at 70° C.

9. The tire of claim 1,
wherein the tread has a second rubber layer adjacent to inside in a radial direction of the first rubber layer,
wherein the second rubber layer is composed of a rubber composition comprising a rubber component and carbon black,
wherein the rubber component constituting the second rubber layer comprises an isoprene-based rubber, and
wherein a complex elastic modulus of the rubber composition constituting the first rubber layer at 70° C. is larger than a complex elastic modulus of the rubber composition constituting the second rubber layer at 70° C.

10. The tire of claim 9, wherein the rubber component constituting the second rubber layer further comprises a butadiene rubber.

11. The tire of claim 8, wherein the deepest part of the groove bottom of the at least one circumferential groove is formed so as to be located more inside in the radial direction of the tire than the outermost part of the second rubber layer.

12. The tire of claim 8, wherein the rubber component constituting the second rubber layer further comprises a butadiene rubber.

13. The tire of claim 1, wherein the groove depth of the deepest part of the circumferential groove is 4.0 mm to 8.0 mm.

14. The tire of claim 1, wherein
   the groove depth of the deepest part of the circumferential groove is 50 to 80% of the thickness of the entire tread part, and
   the groove depth of the deepest part of the lateral groove is 85% or more of the thickness of the entire tread part.

15. The tire of claim 1, wherein the complex elastic modulus of the rubber composition constituting the first rubber layer at 70° C. is 8.5 to 15.0 MPa.

16. The tire of claim 1, wherein the rubber component constituting the first rubber layer comprises 15 to 40% by mass of an isoprene-based rubber.

\* \* \* \* \*